(Model.)
J. T. REDINGTON.
TOOTHED WHEEL.
No. 393,518.  Patented Nov. 27, 1888.
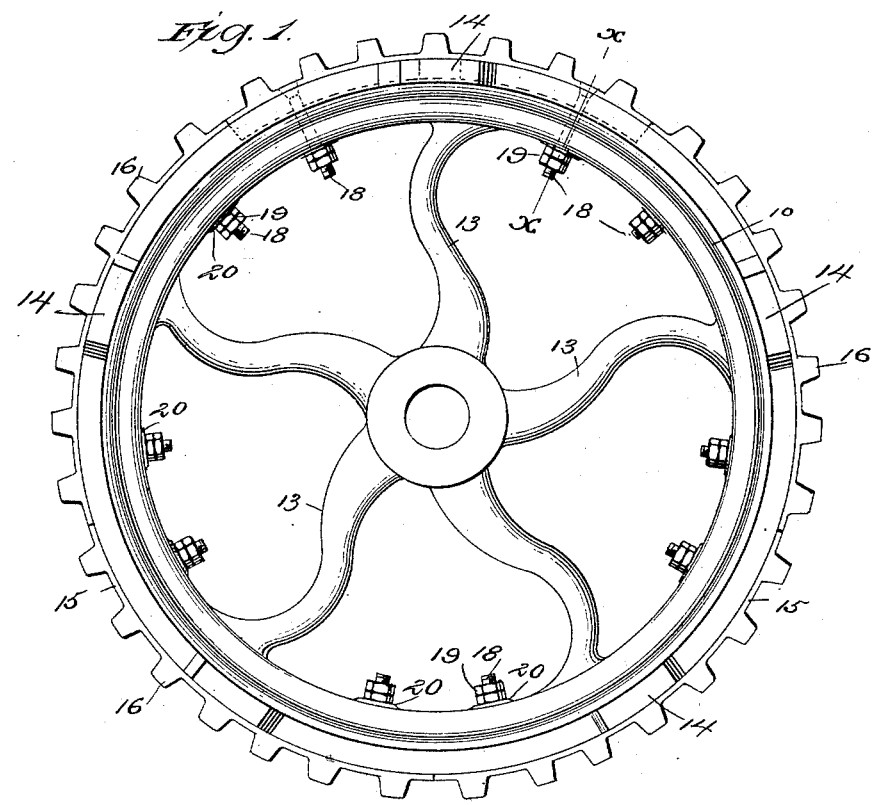
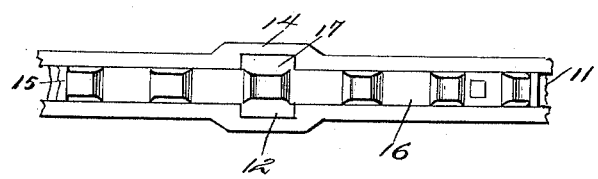
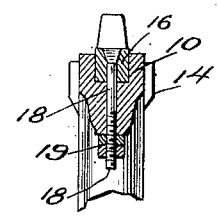
WITNESSES:
N. R. Davis.
C. Sedgwick.
INVENTOR,
J. T. Redington
BY Munn & Co.
ATTORNEY.

UNITED STATES PATENT OFFICE.

JOHN T. REDINGTON, OF AMBLER, PENNSYLVANIA, ASSIGNOR OF ONE-HALF TO THOMAS REDINGTON, JR., OF SAME PLACE.

TOOTHED WHEEL.

SPECIFICATION forming part of Letters Patent No. 393,518, dated November 27, 1888.

Application filed May 17, 1888. Serial No. 274,154. (Model.)

*To all whom it may concern:*

Be it known that I, JOHN T. REDINGTON, of Ambler, in the county of Montgomery and State of Pennsylvania, have invented a new and Improved Toothed Wheel, of which the following is a full, clear, and exact description.

My invention relates to an improvement in toothed wheels, and has for its object to provide a means whereby a tooth or teeth may be simply and expeditiously removed from the body of a wheel when broken, or for other reasons, and as readily replaced.

The invention consists in providing the periphery of a wheel with detachable segmental sections carrying one or more teeth or sprockets, and in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a front elevation of my improved wheel. Fig. 2 is a partial face view of the same; and Fig. 3 is a transverse section on line *x x*, Fig. 1.

In carrying out the invention the body of the wheel 10 is formed in any well-known manner, and cast or otherwise produced from any desirable or suitable material. The periphery of the wheel is provided with a continuous groove, 11, and at intervals offset recesses 12 are formed, intersecting the groove, which recesses are preferably located immediately above the spokes 13, when such spokes are applied, and extend into aligning offsets 14, formed upon the sides of the wheel at the periphery, as best shown in Figs. 2 and 3. A series of segmental blocks, 15, are inserted in the groove 11, which blocks carry upon their outer face one or more teeth or sprockets, 16, preferably more than one. Each of the segmental blocks above referred to is provided centrally of its sides with aligning lugs 17, the several lugs being adapted to enter the recesses 12, as best shown in Fig. 2. The lugs and recesses are provided in order that the several segmental blocks which form the working periphery of the wheel may be securely held in a fixed position, and whereby the strain of work will be taken off the fastening-bolts and be sustained by the aforesaid lugs 17.

As means of securing the several segmental blocks in their position in the body of the wheel, two or more bolts, 18, are passed through each section from the top—one at each side of the lugs 17—the said bolts being projected through the body of the wheel and retained in place through the medium of lock-nuts 19, engaging bosses 20, formed upon the inner face of the rim of wheel, as best illustrated in Figs. 1 and 3. The bolts are preferably provided with essentially wedge-shaped heads, as shown in Fig. 3, whereby they are prevented from turning when inserted in the wheel.

I desire it distinctly understood that I do not limit myself to the bolts as means of securing the segmental blocks to the wheel, as other improved and equivalent means may be substituted without departing from the spirit of the invention. Nor do I confine myself to any particular metal or metals in the construction of the said wheel and the said segmental blocks, or to the arrangement of the lugs 17 thereon.

It will be observed that by simply withdrawing the bolts 18 any one or more sections may be taken out from the wheel, if damaged, and other sections substituted, without disturbing the remaining sections in the said wheel.

Having thus described my invention, what I claim as new, and desire to secure by Letters Patent, is—

1. The combination, with a wheel provided with a continuous peripheral groove and offset recesses intersecting said groove, of a series of segments having teeth or sprockets upon the outer face and aligning side lugs integral with the several segments adapted to enter the said recesses of the wheel, substantially as and for the purpose specified.

2. The combination, with a wheel having a peripheral groove and provided with offset recesses intersecting the said groove, of a series of teeth-carrying segments having aligning side lugs integral therewith and adapted to enter the recesses of the wheel, and bolts passing through the rim of said wheel and the segments, substantially as and for the purpose specified.

JOHN T. REDINGTON.

Witnesses:
 JOS. A. BUCHANAN,
 J. F. HOUGH.